(12) United States Patent
Cheang et al.

(10) Patent No.: US 7,348,530 B2
(45) Date of Patent: Mar. 25, 2008

(54) SYSTEM, METHOD AND APPARATUS FOR REGULATING THE LIGHT EMITTED BY A LIGHT SOURCE

(75) Inventors: Felix Tak Meng Cheang, Penang (MY); Fook Chuin Ng, Butterworth Penang (MY); Choon Guan Ko, Dua Penang (MY)

(73) Assignee: Avago Technologies ECBU IP Pte Ltd

( * ) Notice: Subject to any disclaimer, the term of this patent is extended or adjusted under 35 U.S.C. 154(b) by 61 days.

(21) Appl. No.: 10/959,939

(22) Filed: Oct. 5, 2004

(65) Prior Publication Data

US 2006/0071146 A1 Apr. 6, 2006

(51) Int. Cl.
  *G01J 1/32* (2006.01)
  *H01J 3/14* (2006.01)
(52) U.S. Cl. ...................... 250/205; 250/216
(58) Field of Classification Search ................ 250/205, 250/216; 385/36, 47, 48
See application file for complete search history.

(56) References Cited

U.S. PATENT DOCUMENTS

| | | | |
|---|---|---|---|
| 5,146,516 A * | 9/1992 | Blumke et al. | 385/36 |
| 5,451,765 A * | 9/1995 | Gerber | 250/205 |
| 6,124,956 A * | 9/2000 | Severn | 398/28 |
| 6,344,641 B1 | 2/2002 | Blalock et al. | |
| 6,448,550 B1 | 9/2002 | Nishimura | |
| 6,481,856 B1 * | 11/2002 | Weissman et al. | 353/98 |
| 6,507,159 B2 | 1/2003 | Muthu | |
| 6,587,214 B1 * | 7/2003 | Munks | 356/519 |
| 6,865,309 B2 * | 3/2005 | Dho | 385/15 |
| 2002/0113192 A1 * | 8/2002 | Antila | 250/205 |
| 2002/0190194 A1 * | 12/2002 | Birrer et al. | 250/214 R |

OTHER PUBLICATIONS

Ken A. Nishimura, "Feed-Forward Methods and Apparatus for Setting the Light Intensities of One or More LEDS", U.S. Appl. No. 10/897,892, filed Jul. 23, 2004.
Ken A. Nishimura, "Mixed-Color Light Emitting Diode Apparatus, and Method for Making Same", U.S. Appl. No. 10/918,149, filed Aug. 13, 2004.
Ken A. Nishimura, "Methods and Apparatus for Regulating the Drive Currents of a Plurality of Light Emitters", U.S. Appl. No. 10/938,998, filed Sep. 10, 2004.
Craig C. Freudenrich, "How Projection Television Works", http://electronics.howstuffworks.com, Aug. 18, 2004, 17 pages.
Murade et al., U.S. Appl. No. 2002/0063676, May 30, 2002.

* cited by examiner

*Primary Examiner*—Thanh X Luu

(57) ABSTRACT

In one embodiment, apparatus is provided with a light source, an optic element, at least one photosensor, and a control system. The optic element has a reflective material on a surface thereof, and is positioned to receive and reflect light emitted by the light source. The at least one photosensor is mounted to the surface of the optic element on which the reflective material resides, over a portion of the optic element on which the reflective material does not reside. The control system is operably associated with both the photosensor(s) and the light source, to regulate the light source's light output in accordance with measurements received from the photosensor(s).

21 Claims, 3 Drawing Sheets

US 7,348,530 B2

SYSTEM, METHOD AND APPARATUS FOR REGULATING THE LIGHT EMITTED BY A LIGHT SOURCE

BACKGROUND

A problem with light sources comprised of one or more solid-state light emitters (e.g., light emitting diodes) is that the intensity of light emitted by a solid-state light emitter is subject to change as a result of changes in its temperature and aging. Furthermore, the characteristics (and thus the light emitting capabilities) of solid-state light emitters may vary from batch to batch. As a result, in systems where the integrity of light emitted by a light source needs to be maintained (e.g., in display backlighting and illumination systems), some sort of system is needed to measure and regulate the light source's light.

SUMMARY OF THE INVENTION

In one embodiment, apparatus comprises a light source, an optic element, at least one photosensor, and a control system. The optic element has a reflective material on a surface thereof, and is positioned to receive and reflect light emitted by the light source. The at least one photosensor is mounted to the surface of the optic element on which the reflective material resides, over a portion of the optic element on which the reflective material does not reside. The control system is operably associated with both the photosensor(s) and the light source, to regulate the light source's light output in accordance with measurements received from the photosensor(s).

In another embodiment, a method comprises projecting a light through an optic element having a reflective material on a surface thereof. The light is then measured using at least one photosensor that is mounted over one or more non-reflective apertures in the reflective material on the optic element. Thereafter, the light is regulated in accordance with measurements taken by the photosensor(s).

In yet another embodiment, a display system comprises a light source. A prism has a reflective material on a surface thereof, and is positioned to receive and reflect light emitted by the light source. At least one photosensor is mounted to the surface of the optic element on which the reflective material resides, over a portion of the optic element on which the reflective material does not reside. A display is positioned to be illuminated by light exiting the optic element. A first optic assembly having a lens is positioned between the light source and the prism; and a second optic assembly having a lens is positioned between the prism and the display. A control system is operably associated with both the photosensor(s) and the light source, and regulates the light source's light output in accordance with measurements received from the photosensor(s).

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Micro-displays, such as liquid crystal on silicon (LCOS) displays, liquid crystal displays (LCDs), and digital micro mirror devices (DMDs), often use filament-based, discharge, white-light lamps to illuminate their displays. Depending on the technology, the displays may be lighted in a transmissive or reflective manner. While filament-based lamps provide good color and consistent brightness (intensity), they generate a lot of heat, have relatively short lifespans, and are not shock resistant. To reduce the cost and increase the efficiency of micro-displays, it would be desirable to replace their filament-based lamps with solid-state light sources, such as light emitting diode (LED) light sources.

LEDs pose to be a useful light source in that they are inexpensive to manufacture, are widely available, and do not generate a lot of heat. However, the physical and electrical characteristics of LEDs (e.g., turn-on voltage) can vary from batch to batch, leading to nominally identical LEDs having different optical properties. Furthermore, the optical properties of LEDs can change or deteriorate with factors such as changes in temperature and age. As a result, in systems where the integrity of light emitted by a light source needs to be maintained (e.g., in a display backlight or illumination system where the intensity and/or color of a light source needs to be maintained), some sort of system is needed to measure and regulate the light source's light.

Figure 1:
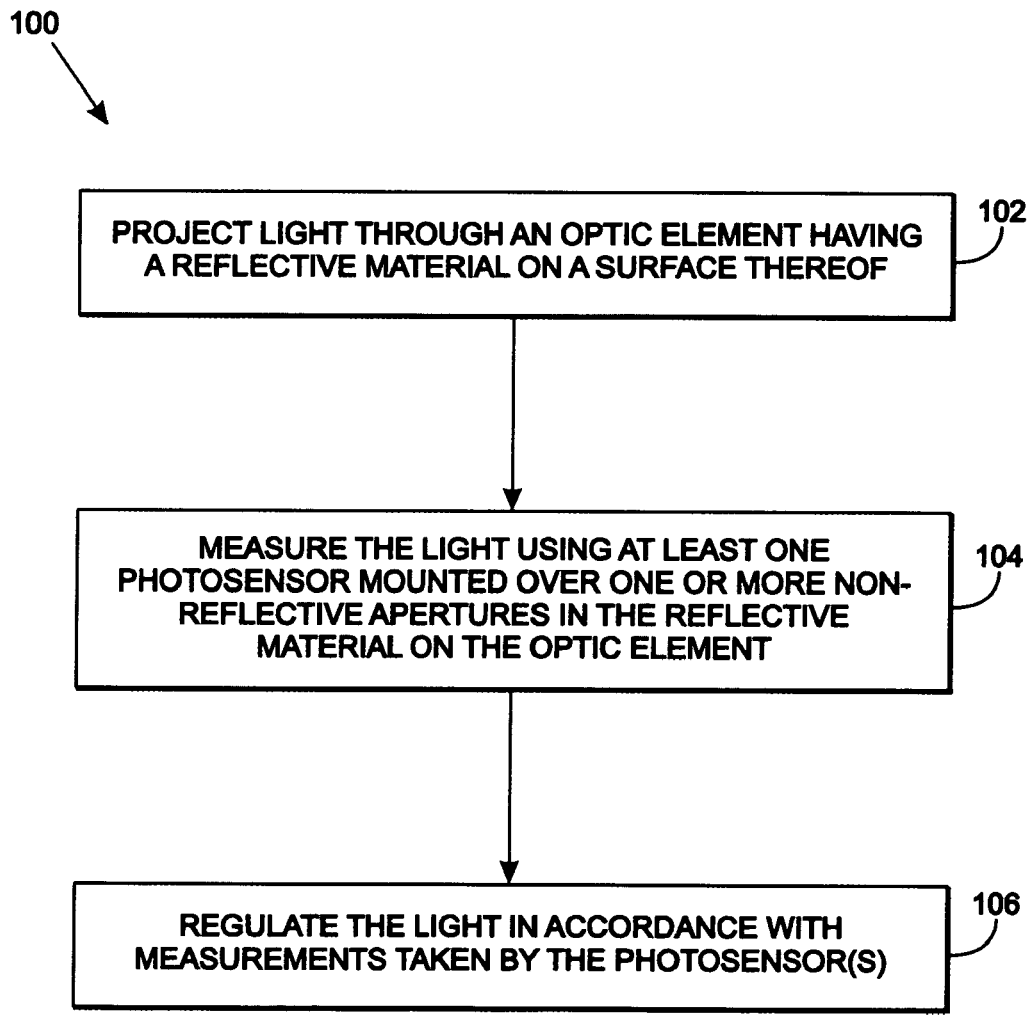
FIG. 1 illustrates an exemplary method for regulating the light emitted by a light source.

FIG. 1 illustrates an exemplary method 100 for regulating the light ($\lambda$, FIG. 2) emitted by a light source 202. In accordance with the method 100, light is projected 102 through an optic element 204 having a reflective material 206 on a surface thereof (see also, FIG. 2). By way of example, the optic element 204 can be a mirror, flexible film or prism. Also, and by way of example, the reflective material can be a reflective coating on the optic element 204 (e.g., a silver coating), or a thin, reflective film (e.g., a foil).

The method 100 continues with a measurement 104 of the light using at least one photosensor 208. The photosensor(s) 208 is/are mounted to the surface of the optic element 204 on which the reflective material 206 resides, over a portion of the optic element 204 on which the reflective material 206 does not reside. By way of example, the photosensor(s) 208 may comprise one or more photodiodes or phototransistors that measure the intensity of one or more wavelengths of light.

After measuring the light, the light can then be regulated 106 in accordance with the measurements taken by the photosensor(s). In one embodiment, this is done via the feedback system 210, 212 shown in FIG. 2.

By way of example, a light may be regulated by comparing at least one intensity measurement received from the photosensor(s) (208) with at least one desired intensity. Then, if an intensity measurement is out of range, the light source 202 may be adjusted.

Figure 2:
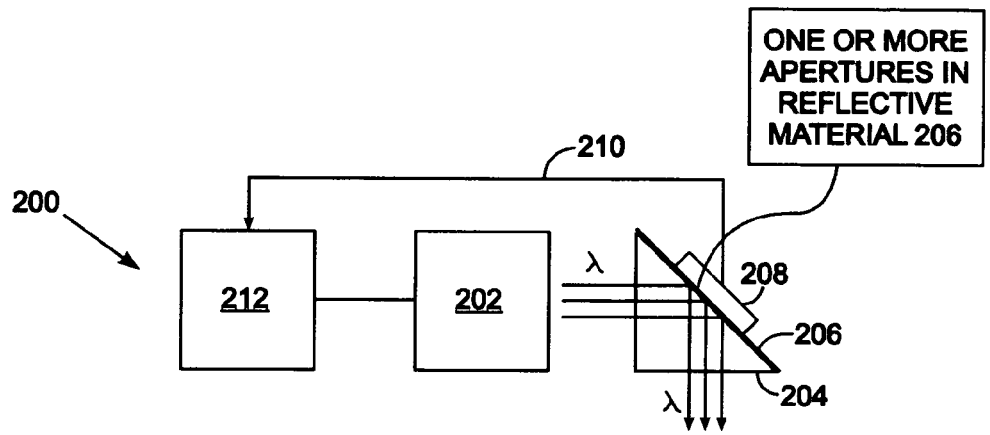
FIG. 2 illustrates a block diagram of an exemplary system for regulating the light emitted by a light source.

As partially introduced, FIG. 2 illustrates an exemplary illumination system 200 comprising a light source 202, an optic element (prism) 204 having a reflective coating 206 thereon, and a photosensor 208. The optic element is positioned in front of the light source 202 to receive and reflect light ($\lambda$) that is emitted by the light source 202. In addition to reflecting the light, the prism 204 may also mix and/or filter the light. Preferably, the photosensor(s) 208 are positioned adjacent one another, and are positioned over one or more non-reflective apertures in the reflective coating 206 on the optic element 204.

Mounting the photosensor 208 on the optic element 204 can be advantageous because it does not block the light (λ), thereby causing substantial light loss or otherwise interfering with light mixing. Rather, the position of the photosensor 208 requires only a small non-reflective aperture in the reflective material 206, and thus only a small amount of light need be allowed to leak out of the reflective side of the optic element 204.

The system 200 also comprises a control system 212. The control system 212 is operably associated with both the photosensor(s) 208 and the light source 202, and thereby regulates the light source's light output in accordance with measurements (e.g., light intensity measurements) received from the photosensor(s) 208.

Figure 3:
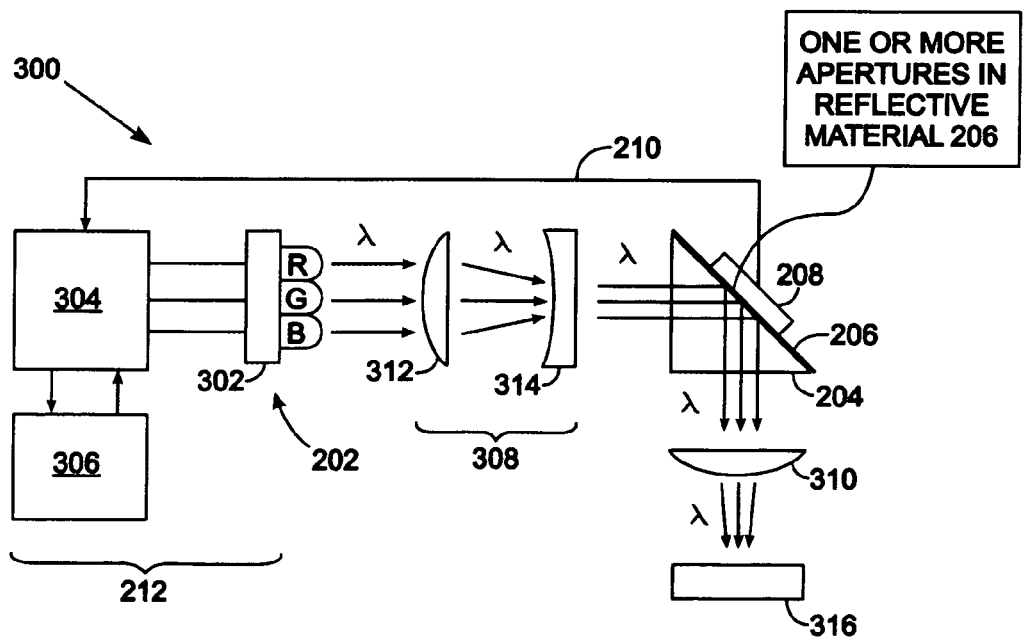
FIG. 3 illustrates an exemplary single photosensor embodiment of the FIG. 2 system.
Figure 4:
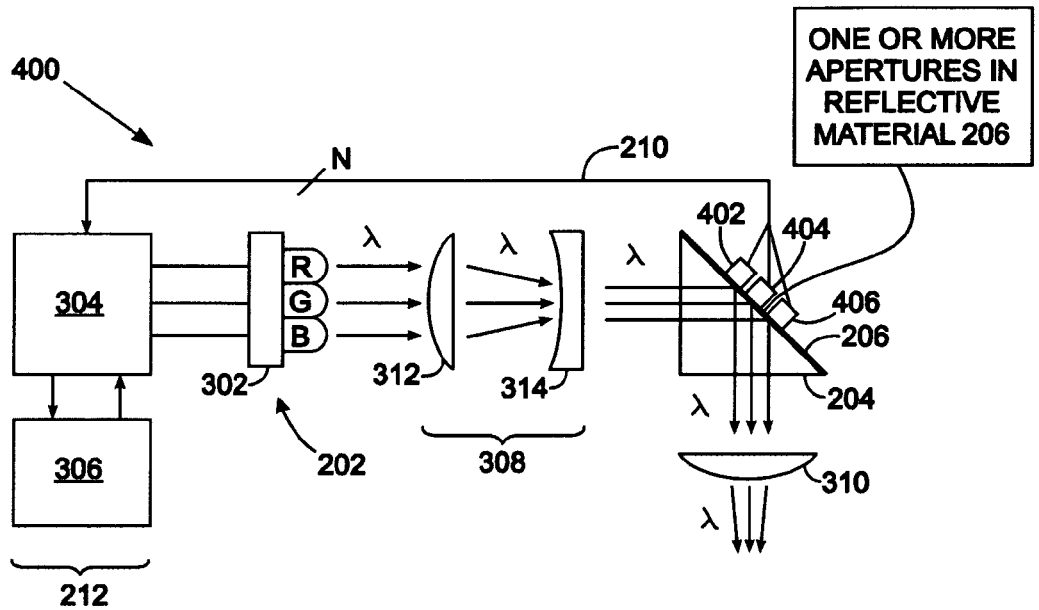
FIG. 4 illustrates an exemplary multi-photosensor embodiment of the FIG. 2 system.

FIG. 3 illustrates an exemplary single photosensor embodiment 300 of the system 200, while FIG. 4 illustrates an exemplary multi-photosensor embodiment of the system 200. In the system 400, different light intensity readings are obtained from a plurality of photosensors 402, 404, 406 that are filtered in different ways so as to measure different wavelengths of light (e.g., red, green and blue light).

In each of the systems 300, 400, the light source 202 may comprise solid-state light emitting elements such as LEDs or laser diodes. By way of example, the systems 300, 400 are shown to comprise red (R), green (G) and blue (B) LEDs. Although one of each is shown, the light source 202 could alternately comprise any number or arrangement of the same or different colored LEDs. In some cases, the light source 202 could also be limited to only a single light emitting element. If this is the case, it might only be possible to control the intensity, and not the color, of the light source 202.

The exemplary embodiment of the control system 212 shown in FIGS. 3 & 4 comprises driver circuitry 302, a color management system 304, and a microcontroller 306. The boundaries between components 302-306 are somewhat arbitrary, and the functionality of the different components 302-306 could alternately be merged or further divided. In use, the color management system 304 receives color and/or intensity settings from the microcontroller 306, and converts the color setting (if provided) to a plurality of intensity settings for the different colored light emitting elements of the light source 202. The color management system 304 also receives intensity measurements from the photosensor 208 (FIG. 3) or photosensors 402-406 (FIG. 4). The color management system 304 then compares corresponding intensity measurements, and if a measurement is out of range, it adjusts the light output of a corresponding light emitting element by, for example, modulating its drive current.

By raising or lowering the drive currents of all light emitting elements in unison, the color management system 304 can thereby control the intensity of the light source 202. By adjusting the ratios of drive currents supplied to the light emitting elements, the color management system 304 can control the color of the light source.

The systems 300, 400 shown in FIGS. 3 & 4 may further comprise additional components, including first and second optics assemblies 308, 310. As shown, the first optics assembly 308 may comprise both a piano-convex 312 and a plano-concave 314 lens, arranged in series between the light source 202 and the prism 204 to first focus the light produced by the light source 202, and then collimate the light prior to it being received by the prism 204. The second optics assembly 310 may comprise a plano-convex lens 310 to further focus the light onto a display 316, or a device or subject being illuminated. The display 316 may take a variety of forms, including that of a micro-display.

Figure 5:
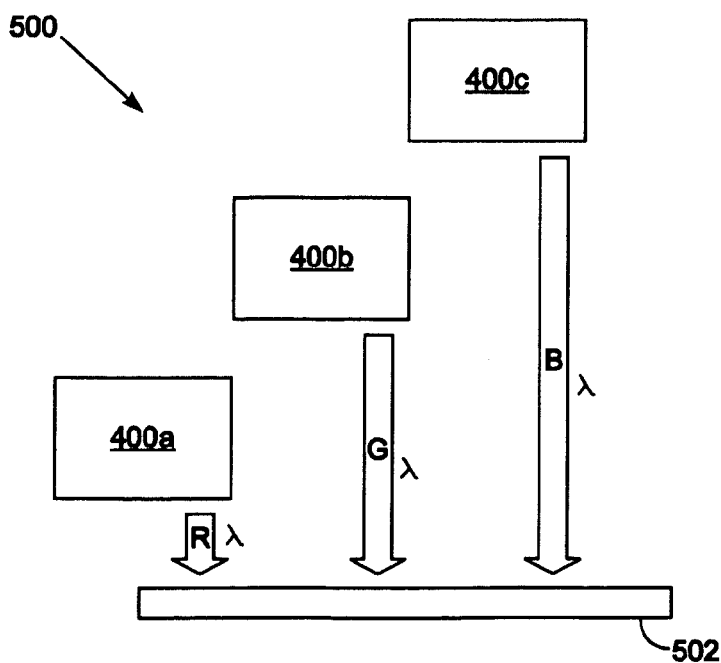
FIG. 5 illustrates an exemplary display system comprising three of the systems shown in FIG. 4.

In some cases, one or more of the systems 300, 400 may be used to light a display 316 in the same manner. For example, one or more systems 300, 400 could each project a white light onto a display 316. In other cases, and as shown in FIG. 5, a plurality of systems 400a, 400b, 400c may each be tuned to project a particular color of light (e.g., red (R), green (G) and blue (B)) on a display 502. Although FIG. 5 shows each different color to be projected on a different portion of the display 502, each color could alternately be scattered to illuminate the whole of display 502.

What is claimed is:

1. An apparatus, comprising:
   a light source;
   an optical element having an optical surface;
   a reflective non-light-transmissive material having an upper first surface and a lower second surface, the first surface being reflective and disposed over at least portions of the optical surface, the reflective material having at least one aperture disposed therein and extending between the first and second surfaces thereof for the passage and measuring of light therebeneath;
   at least one photosensor positioned near the second surface and adjacent to the aperture such that light incident on the aperture is measured by the photosensor;
   a control system operably associated with the photosensor and the light source and configured to control the output of the light source in accordance with measurements received from the photosensor;
   a display configured for illumination by light reflected from the first surface;
   a first optical assembly having a lens positioned between the light source and the optical element, and
   a second optical assembly having a lens positioned between the optical element and the display.

2. The apparatus of claim 1, wherein the at least one photosensor comprises two different photosensors having differently filtered inputs and measuring different wavelengths of light.

3. The apparatus of claim 1, wherein the light source comprises red, green and blue light emitting elements, the at least one photosensor measures red, green and blue wavelengths of light, and the control system separately regulates the intensities of the red, green and blue light emitting elements in accordance with measurements received from the at least one photosensor.

4. The apparatus of claim 1, wherein the light emitting elements comprise light emitting diodes (LEDs).

5. The apparatus of claim 1, wherein the light source comprises at least one solid-state light emitting element.

6. The apparatus of claim 1, wherein the light source comprises one or more light emitting diodes (LEDs).

7. The apparatus of claim 1, wherein the at least one photosensor comprises a plurality of photosensors positioned adjacent to one another.

8. The apparatus of claim 1, wherein the at least one aperture is substantially non-reflective of light.

9. The apparatus of claim 1, wherein the reflective material is a coating or comprises silver.

10. A method of measuring and controlling the light emitted by a light source with a system, the system comprising a light source, an optical element having an optical surface, a reflective non-light-transmissive material having an upper first surface and lower second surface, the first surface being reflective and disposed over at least portions of the optical surface, the reflective material having at least one aperture disposed therein and extending between the first and second surfaces thereof for the passage and measurement of light therebeneath, at least one photosensor positioned near the second surface of the reflective material and adjacent to the aperture such that light incident on the aperture is measured by the photosensor, and a control system operably associated with the photosensor and the light source to control the output of the light source in accordance with measurements received from the photosensor, the method comprising:

projecting a light from the light source towards the optical surface;

measuring at least a portion of the light incident on the aperture using the photosensor;

conveying information corresponding to such measurement to the control system, and controlling the output of the light source in accordance with measurements taken by the at least one photosensor;

wherein the at least one photosensor comprises a plurality of photosensors for measuring red, green and blue wavelengths of light, the light source comprises red, green and blue light emitting elements, and the output of the light emitting elements is controlled by separately modulating the red, green and blue light emitting elements.

11. The method of claim 10 wherein the output of the light source is controlled by:

comparing (i) at least one intensity measurement received from the at least one photosensor with (ii) at least one desired intensity; and if the at least one intensity measurement is out of range, adjusting the light emitted by the light source.

12. The method of claim 10 wherein the optical element is a prism.

13. A display system, comprising:

a light source;

a prism having an optical surface;

a reflective non-light-transmissive material having an upper first surface and lower second surface, the first surface being reflective and disposed over at least portions of the optical surface, the reflective material having at least one aperture disposed therein and extending between the first and second surfaces thereof for the passage and measurement of light therebeneath;

at least one photosensor positioned near the second surface and adjacent to the aperture such that light incident on the aperture is measured by the photosensor, and a display, positioned to be illuminated by light reflected from the first surface;

a first optical assembly comprising a lens and positioned between the light source and the prism;

a second optical assembly comprising a lens and positioned between the prism and the display; and a control system, operably associated with the photosensor and the light source, to regulate the output of the light source in accordance with measurements received from the photosensor.

14. The display system of claim 13, wherein the reflective material comprises a coating.

15. The display system of claim 13, wherein the reflective material comprises silver.

16. The display system of claim 13, wherein the at least one photosensor comprises at least two different photosensors having differently filtered inputs and measuring different wavelengths of light.

17. The display system of claim 13, wherein the light source comprises red, green and blue light emitting elements, the at least one photosensor measures red, green and blue wavelengths of light, and the control system separately regulates the intensities of the red, green and blue light emitting elements in accordance with measurements received from the at feast one photosensor.

18. The display system of claim 13, wherein the light emitting elements comprise light emitting diodes (LEDs).

19. The display system of claim 13, wherein the light source comprises at least one solid-state light emitting element.

20. The display system of claim 13, wherein the light source comprises one or more light emitting diodes (LEDs).

21. The display system of claim 13, wherein the at least one photosensor comprises a plurality of photosensors positioned adjacent to one another.

\* \* \* \* \*

UNITED STATES PATENT AND TRADEMARK OFFICE
CERTIFICATE OF CORRECTION

| | |
|---|---|
| PATENT NO. | : 7,348,530 B2 |
| APPLICATION NO. | : 10/959939 |
| DATED | : March 25, 2008 |
| INVENTOR(S) | : Felix Tak Meng Cheang et al. |

It is certified that error appears in the above-identified patent and that said Letters Patent is hereby corrected as shown below:

In the Claims:

Column 5, Line 30, Claim 11, after "claim 10" insert -- , --;

Column 5, Line 37, Claim 12, after "claim 10" insert -- , --;

Column 6, Line 32, Claim 17, delete "feast" and insert -- least --.

Signed and Sealed this

Twenty-sixth Day of October, 2010

David J. Kappos
*Director of the United States Patent and Trademark Office*